(12) United States Patent
Triandopoulos et al.

(10) Patent No.: US 11,115,196 B1
(45) Date of Patent: Sep. 7, 2021

(54) METHODS AND APPARATUS FOR SECRET SHARING WITH VERIFIABLE RECONSTRUCTION TYPE

(71) Applicant: EMC IP Holding Company LLC, Hopkinton, MA (US)

(72) Inventors: Nikolaos Triandopoulos, Arlington, MA (US); Kevin D. Bowers, Melrose, MA (US); Yupeng Zhang, College Park, MD (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1085 days.

(21) Appl. No.: 14/962,553

(22) Filed: Dec. 8, 2015

(51) Int. Cl.
*H04L 9/08* (2006.01)
*H04L 29/06* (2006.01)

(52) U.S. Cl.
CPC .......... *H04L 9/085* (2013.01); *H04L 63/061* (2013.01); *H04L 63/062* (2013.01); *H04L 63/083* (2013.01); *H04L 63/0853* (2013.01); *H04L 63/126* (2013.01); *H04L 63/20* (2013.01)

(58) Field of Classification Search
CPC ....................................................... H04L 9/085
See application file for complete search history.

(56) References Cited

U.S. PATENT DOCUMENTS

| | | | |
|---|---|---|---|
| 5,764,767 A * | 6/1998 | Beimel | H04L 9/085 380/286 |
| 7,421,080 B2 * | 9/2008 | Matsumura | H04L 9/085 380/277 |
| 7,428,751 B2 * | 9/2008 | Oom Temudo de Castro | G06F 21/40 713/158 |
| 8,205,090 B2 * | 6/2012 | Oom Temudo de Castro | G06F 21/40 713/168 |

(Continued)

FOREIGN PATENT DOCUMENTS

WO 2015025232 A1 2/2015

OTHER PUBLICATIONS

C. Papamanthou et al. Signatures of Correct Computation, in Theory of Cryptography, pp. 222-242. Springer, 2013.

(Continued)

*Primary Examiner* — Bradley W Holder
(74) *Attorney, Agent, or Firm* — Ryan, Mason & Lewis, LLP

(57) ABSTRACT

Methods and apparatus are provided for secret sharing with a verifiable reconstruction type. An exemplary method comprises receiving a plurality of shares of a secret generated using a secret splitting scheme; reconstructing the secret if the plurality of shares satisfies a predefined reconstruction threshold; and generating a proof identifying at least one of the plurality of shares used in the reconstruction. The proof is optionally verified by a verifier and the verification is (Continued)

optionally based on auxiliary information derived by the secret splitting scheme used to share the secret. The verifier optionally implements layered access control, for example, based on a rank of the shares used for reconstruction. The reconstructed secret is optionally provided to the verifier. A user can be granted a level of access to a protected resource based on the proof, the reconstructed secret and one or more predefined policies. One or more steps can be proactivized to maintain share freshness.

25 Claims, 8 Drawing Sheets

(56) References Cited

U.S. PATENT DOCUMENTS

| | | | | |
|---|---|---|---|---|
| 8,483,386 B2* | 7/2013 | Obana | .................... | H04L 9/085 380/259 |
| 8,713,329 B2* | 4/2014 | Schneider | ............... | H04L 9/085 380/255 |
| 8,842,835 B2* | 9/2014 | Geyzel | .................... | H04L 9/085 380/277 |
| 9,331,984 B2* | 5/2016 | Matsuo | ................. | H04L 9/0869 |
| 2004/0111608 A1* | 6/2004 | Oom Temudo de Castro | ............ | G06F 16/182 713/156 |
| 2004/0179686 A1* | 9/2004 | Matsumura | ............. | H04L 9/085 380/44 |
| 2009/0019288 A1* | 1/2009 | Oom Temudo de Castro | ............ | G06F 21/40 713/181 |
| 2009/0077379 A1* | 3/2009 | Geyzel | .................... | H04L 9/085 713/170 |
| 2010/0217986 A1* | 8/2010 | Schneider | ............. | H04L 9/3242 713/171 |
| 2010/0260334 A1* | 10/2010 | Obana | .................... | H04L 9/085 380/28 |
| 2011/0126291 A1* | 5/2011 | Araki | ...................... | H04L 9/085 726/26 |
| 2014/0173270 A1* | 6/2014 | Matsuo | ................. | H04L 9/0869 713/150 |
| 2016/0156611 A1 | 6/2016 | Rozman | | |

OTHER PUBLICATIONS

A. Shamir, How to Share a Secret, Communications of the ACM, 22(11):612-613, 1979.

\* cited by examiner

| DEALER | DEALER | RECONSTRUCTOR | CHECKER |
|---|---|---|---|
| RUN $pub = (p, \mathbb{G}, \mathbb{G}_T, e, g) \leftarrow \text{BilGen}(1^k)$<br><br>SELECT POLYNOMIAL $f(x)$ OF DEGREE $t-1$ WHERE $f(0) = w$ AND $N$ RANDOM IDs<br><br>SET $s_i = f(e_i)$, $\forall i$ AND SEND $(e_i, s_i)$ TO PLAYER $P_i$ AS ITS ID AND SHARE.<br><br>SELECT $s \in \mathbb{Z}_p^*$ RANDOMLY AND PUBLISH $pk = pub, g^s, g^{s^2}, ..., g^{s^q}$ AS THE PUBLIC KEY<br><br>SEND $w, g^{e_l}, g^{s_l}, g^{f(s)}$ TO CHECKER | EACH PLAYER KEEPS ITS ID AND SHARE SECRET | COLLECT $t$ OR MORE PAIRS OF ID AND SHARE FROM PLAYERS<br><br>RECONSTRUCT $f(x)$ BY POLYNOMIAL INTERPOLATION<br><br>WHEN $\mathcal{R}$ HAS ACCESS TO PAIR $(e_l, s_l)$, COMPUTE THE POLYNOMIAL $q(x) = (f(x) - s_l)/(x - e_l)$ BY POLYNOMIAL DIVISION AND SET THE WITNESS $\pi = g^{q(s)}$ USING $pk$<br><br>SEND THE KEY AND THE WITNESS $w, \pi$ TO CHECKER | STORE $w, g^{e_l}, g^{s_l}, g^{f(s)}$<br><br>UPON RECEIVING $w^*, \pi$ FROM $\mathcal{R}$, CHECK $w \stackrel{?}{=} w^*$ AND $e(g^{f(s)-s_l}, g) \stackrel{?}{=} e(g^{s-e_l}, \pi)$ |

FIG. 5

| DEALER | DEALER | RECONSTRUCTOR | CHECKER |
|---|---|---|---|
| RUN $pub = (p, \mathbb{G}, \mathbb{G}_T, e, g) \leftarrow \text{BilGen}(1^k)$<br><br>SELECT POLYNOMIAL $f(x)$ OF DEGREE $t-1$ WHERE $f(0) = w$<br><br>SELECT A SEED $sk$ AND SET $e_i = \text{PRF}(sk, i)$ AND $s_i = f(e_i)$, $\forall i$ AND SEND $(e_i, s_i)$ TO PLAYER $P_i$ AS ITS ID AND SHARE.<br><br>SELECT $s \in \mathbb{Z}_p^*$ RANDOMLY AND PUBLISH $pk = pub, g^s, \ldots, g^{s^q}$ AS THE PUBLIC KEY<br><br>SEND $w, sk, g^{f(s)}$ TO CHECKER | EACH PLAYER KEEPS ITS ID AND SHARE SECRET | COLLECT $t$ OR MORE PAIRS OF ID AND SHARE FROM PLAYERS<br><br>RECONSTRUCT $f(x)$ BY POLYNOMIAL INTERPOLATION<br><br>TO PROVE ACCESS TO PAIR $(e_i, s_i)$, COMPUTE THE POLYNOMIAL $q_i(x) = (f(x) - s_i)/(x - e_i)$ BY POLYNOMIAL DIVISION AND SET THE WITNESS $\pi_1 = g^{s_i}$, $\pi_2 = g^{q_i(s)}$ USING $pk$<br><br>SEND THE KEY $w$ AND THE CLAIMED WITNESS $\pi_1, \pi_2$ TO CHECKER | STORE $w, sk, g^{f(s)}$<br><br>UPON RECEIVING $w^*, i, \pi_1, \pi_2$ FROM $\mathcal{R}$, COMPUTE $e_i = \text{PRF}(sk, i)$ AND CHECK $w^*$ AND $e(g^{f(s)}/\pi_1, g) e(g^{s-e_i}, \pi_2)$ |

| DEALER | DEALER | RECONSTRUCTOR | CHECKER |
|---|---|---|---|
| RUN $pub = (p, G, G_T, e, g) \leftarrow BiGen(1^k)$ | EACH PLAYER KEEPS ITS ID AND SHARE SECRET | COLLECT $t$ OR MORE PAIRS OF ID AND SHARE FROM PLAYERS | SEND $w, g^{\prod_{i=1}^{m}(f(s)-s_{l_i})}, g^{\prod_{i=1}^{m}(s-e_{l_i})}$ |
| SELECT POLYNOMIAL $f(x)$ OF DEGREE $t-1$ WHERE $f(0) = w$ AND $n$ RANDOM IDs | | RECONSTRUCT $f(x)$ BY POLYNOMIAL INTERPOLATION | UPON RECEIVING $w^*, \pi$ FROM $\mathcal{R}$, CHECK $w^*$ AND $e(g^{\prod_{i=1}^{m}(f(s)-s_{l_i})}, g) e(g^{\prod_{i=1}^{m}(s-e_{l_i})}, \pi)$ |
| SET $s_i = f(e_i), \forall i$ AND SEND $(e_i, s_i)$ TO PLAYER $P_i$ AS ITS ID AND SHARE. | | WHEN $\mathcal{R}$ HAS ACCESS TO ALL PAIRS IN $\{(e_{l_1}, s_{l_1}), \ldots, (e_{l_m}, s_{l_m})\}$, COMPUTE THE POLYNOMIAL $q_i(x) = (f(x) - s_{l_i})/(x - e_{l_i})$ | |
| SELECT $s \in Z_p^*$ RANDOMLY AND PUBLISH $pk = pub, g^s, \ldots, g^{s^q}$ AS THE PUBLIC KEY | | FOR $i = 1, \ldots, m$ BY POLYNOMIAL DIVISION AND SET THE WITNESS $\pi = g^{\prod_{i=1}^{m} q_i(s)}$ USING $pk$ | |
| SEND $w, g^{\prod_{i=1}^{m}(f(s)-s_{l_i})}, g^{\prod_{i=1}^{m}(s-e_{l_i})}$ TO CHECKER | | SEND THE KEY AND THE WITNESS $w, \pi$ TO CHECKER | |

FIG. 7

| DEALER | DEALER | RECONSTRUCTOR | CHECKER |
|---|---|---|---|
| RUN $pub = (p, \mathbb{G}, \mathbb{G}_T, e, g) \leftarrow \text{BilGen}(1^k)$<br><br>SELECT POLYNOMIAL $f(x)$ OF DEGREE $t-1$ WHERE $f(0) = w$ AND $n$ RANDOM IDs<br><br>SET $s_i = f(e_i)$, $\forall i$ AND SEND $(e_i, s_i)$ TO PLAYER $P_i$ AS ITS ID AND SHARE.<br><br>SELECT $s \in \mathbb{Z}_p^*$ RANDOMLY AND PUBLISH $pk = pub, g^s, ..., g^{s^q}$ AS THE PUBLIC KEY<br><br>SEND $w, f(x), e_1, ..., e_n, s_1, ..., s_n$ TO CHECKER | EACH PLAYER KEEPS ITS ID AND SHARE SECRET | COLLECT $t$ OR MORE PAIRS OF ID AND SHARE FROM PLAYERS<br><br>RECONSTRUCT $f(x)$ BY POLYNOMIAL INTERPOLATION<br><br>TO PROVE ACCESS TO SHARES FROM A SET OF PLAYERS $\{P_{l_1}, ..., P_{l_t}\}$ OF SIZE $t$, COMPUTE $q(x) = (f(x) - s_l)/(x - e_l)$ FOR $i \in \{l_1, ..., l_t\}$ THROUGH POLYNOMIAL DIVISION<br><br>COMPUTE POLYNOMIAL $q(x) = \Pi_{i=l_1}^{l_t} q_i(x)$ BY FFT AND SET WITNESS $\pi = g^{q(s)}$<br><br>SEND $w, S$ AND $\pi$ TO CHECKER | SEND $w, g^{e_l}, g^{s_l}, g^{f(s)}$<br><br>UPON RECEIVING $w^*, \pi$ FROM $\mathcal{R}$, CHECK $w^*$ AND $e(g^{f(s) - s_l}, g)e(g^{s - e_l}, \pi)$ |

700

METHODS AND APPARATUS FOR SECRET SHARING WITH VERIFIABLE RECONSTRUCTION TYPE

CROSS-REFERENCE TO RELATED APPLICATIONS

The present application is related to U.S. patent application Ser. No. 14/319,276, filed Jun. 30, 2014, (now U.S. Pat. No. 9,461,821), entitled "System and Method for Key Material Protection on Devices Using a Secret Sharing Scheme;" U.S. patent application Ser. No. 14/577,206, filed Dec. 19, 2014, (now U.S. Pat. No. 9,455,968), entitled "Protection of a Secret on a Mobile Device Using a Secret-Splitting Technique with a Fixed User Share;" U.S. patent application Ser. No. 14/664,338, filed Mar. 20, 2015, (now U.S. Pat. No. 9,703,965), entitled "Secure Containers for Flexible Credential Protection in Devices;" and U.S. patent application Ser. No. 14/672,507, filed Mar. 30, 2015, (now U.S. Pat. No. 9,813,243),entitled "Methods and Apparatus for Password-Based Secret Sharing Scheme," each incorporated by reference herein.

FIELD

The present invention relates to the protection of secret keys and other information in devices.

BACKGROUND

Secret sharing schemes comprise a cryptographic tool for implementing secure distributed protocols, allowing the splitting of a secret (typically, a cryptographic key) into a number of randomly produced pieces, or shares, and their dispersal to corresponding entities, during a secret sharing phase. This secret may become available again, during a secret reconstruction phase, only by combining a number of these shares that satisfy some well-defined conditions. Shamir's Secret Sharing Scheme (see, e.g., A. Shamir, "How to Share a Secret," Communications of the Association of Computer Machinery, Vol. 22, No. 11, 612-13 (1979)) is the most widely used secret sharing scheme, allowing secret reconstruction under threshold conditions.

In certain settings, for instance, in settings where secret sharing is used to support secure distributed access control and management over protected resources, it is useful that one or more of the shares are chosen according to some external criteria (e.g., independently of the secret being split or the secret sharing method itself). Thus, techniques have been proposed or suggested for extending secret sharing schemes to support sharing of secrets into shares so that one or more shares take on some predetermined fixed values and not arbitrary values that are randomly chosen during the secret sharing phase. For example, U.S. patent application Ser. No. 14/577,206, filed Dec. 19, 2014, (now U.S. Pat. No. 9,455,968), entitled "Protection of a Secret on a Mobile Device Using a Secret-Splitting Technique with a Fixed User Share," incorporated by reference herein, discloses the use of "fixed shares" for enabling flexible reconstruction policies of keys split using Shamir's sharing scheme that allow for the use of one or more user-defined shares (e.g., a password) during key reconstruction.

Moreover, U.S. patent application Ser. No. 14/672,507, filed Mar. 30, 2015, (now U.S. Pat. No. 9,813,243), entitled "Methods and Apparatus for Password-Based Secret Sharing Scheme," incorporated by reference herein, describes threshold password-based secret sharing (or PBSS) schemes, where, during the secret sharing phase, one or more of the shares, into which a given secret is split, can take on some predetermined fixed values (e.g., a password) that can be provided as additional inputs to the secret sharing algorithm, without otherwise affecting the security of the scheme (other than, e.g., the strength of the chosen password) or its functionality during the secret reconstruction phase.

In the setting of distributed access control and management, a secret that is associated with a protected resource (such as a credential, e.g., a cryptographic key used to encrypt a sensitive file) is split into shares, using, for instance, a threshold secret sharing scheme (such as Shamir's scheme), where some of the shares may be fixed, as described above. Then, managing access to this resource is reduced to managing access to the appropriate set of shares. In a threshold key-splitting system, for instance, access to the resource is granted to a requestor requesting access, as long as the requestor gets access to an appropriate number of shares, successfully reconstructs the secret (credential) that is associated with the resource, and presents this secret to an access manager of the resource.

In at least one embodiment, the above methods may be limited to an "all-or-nothing" access control model. The requestor can present the associated credential and be granted full access to the protected resource, or the requestor is denied access. In many real-life access control systems, however, it is helpful to support more finely grained access control decisions, where a requestor who successfully presents the associated credential of a protected resource receives different levels of service related to this resource depending on the particular type of shares the requestor was able to collect in order to reconstruct the credential. For instance, in the exemplary key spitting system described in U.S. patent application Ser. No. 14/577,206, (now U.S. Pat. No. 9,455,968), referenced above, it may be important to further differentiate whether an authorized user who successfully reconstructs the decryption key of an encrypted file did this while operating (with his or her mobile device) in an online or offline mode, as an online mode can be associated with higher assurance (e.g., more secure) operational settings, and therefore be related to more access on the protected resource and/or better service levels. For example, a mobile phone may operate in an online mode if the mobile phone is capable of successfully communicating with a designated corporate authentication server to receive a special "online" share that is used for reconstructing the key.

A need remains for secret sharing schemes that allow for secret reconstruction that, in addition to the reconstructed key, indicates which particular subset of shares was used during this secret reconstruction.

SUMMARY

Illustrative embodiments of the present invention provide methods and apparatus for secret sharing with a verifiable reconstruction type. In one exemplary embodiment, a method comprises receiving a plurality of shares of a secret, wherein a set of the shares comprising the plurality of shares is generated from the secret using a secret splitting scheme, wherein the secret can be reconstructed from a subset of the set of shares that satisfies a predefined reconstruction threshold; reconstructing the secret if the plurality of shares satisfy the predefined reconstruction threshold; and generating a proof identifying at least one of the plurality of shares that was used in the reconstruction of the secret.

In one or more embodiments, the proof is provided to a verifier, wherein the verifier has no access to the plurality of shares used in the reconstruction, wherein the provided proof is verified by the verifier, wherein the proof comprises a representation of the at least one share used in the reconstruction, and wherein the proof verification performed by the verifier is based on auxiliary information derived by the secret splitting scheme used to share the secret.

In one or more embodiments, the reconstructed secret is provided to the verifier. The secret comprises, for example, a cryptographic key that protects a resource access-controlled by the verifier, wherein the reconstruction is associated with a user requesting access to the protected resource, and wherein the user is granted, by the verifier, a level of access to the protected resource based on a content of the proof the reconstructed secret and one or more predefined policies. The reconstruction can be performed on behalf of the verifier, and the proof allows the verifier to subsequently gain visibility on a type of the reconstruction and/or to subsequently certify whether the reconstruction using the plurality of shares is one or more of a normal type and an emergency type.

In one exemplary embodiment, the proof identifies one or more of (i) whether one particular predefined share from the set was used in the reconstruction of the secret, wherein the predefined share is possessed by one predefined party; (ii) whether one predefined share from the set of shares was used in the reconstruction of the secret; (iii) whether one predefined subset of the set was used in the reconstruction of the secret; (iv) the plurality of shares from the set that were used in the reconstruction of the secret; and (v) at least one share from the set that was not used in the reconstruction of the secret.

In at least one embodiment, the steps prior to the reconstructing step are proactivized based on a secret challenge specified by a verifier of the proof. The obtained plurality of shares comprises a new sharing of the secret that is based on the secret challenge, and the reconstructing and generating steps are based on the new sharing of the secret.

Embodiments of the invention can be implemented in a wide variety of different devices and applications for the protection of key material or other protected material using secret sharing with reconstruction verification.

BRIEF DESCRIPTION OF THE DRAWINGS

FIGS. 4 through 7 are tables illustrating the functionality of each party of FIG. 3 for a number of exemplary secret sharing schemes with reconstruction verification;

DETAILED DESCRIPTION

Figure 1:
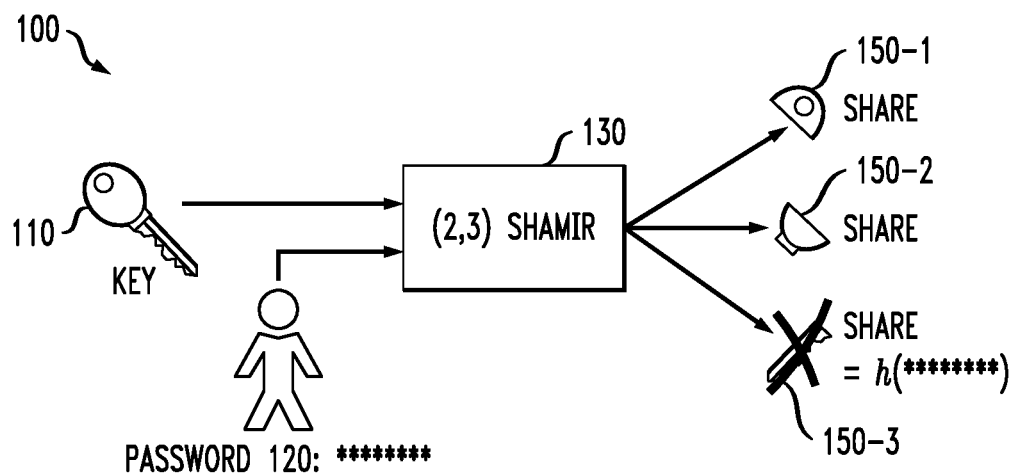
FIG. 1 illustrates an exemplary password-based secret sharing technique.

Illustrative embodiments of the present invention will be described herein with reference to exemplary communication systems and associated servers, clients and other processing devices. It is to be appreciated, however, that the invention is not restricted to use with the particular illustrative system and device configurations shown. While one or more exemplary embodiments of the invention are illustrated using a password-based secret sharing scheme, other threshold secret sharing schemes can be employed, as would be apparent to a person of ordinary skill in the art.

In one or more exemplary embodiments, the present invention provides a threshold secret sharing scheme with a verifiable reconstruction type. Namely, in one or more exemplary embodiments, the scheme is orchestrated such that any entity (e.g., an authorized user) that possesses a number of shares at least as large as the reconstruction threshold, t, can generate, in addition to the reconstructed key, a cryptographic proof about the type of reconstruction that happened, i.e., about a property of the used subset of shares.

In at least one embodiment, a secret reconstruction is performed over a given share subset $S=(s_1, s_2, \ldots, s_t)$ and produces a verifiable proof on a property of S (in addition to the secret w). The proof can be verified by a semi-trusted entity that "consumes" the reconstructed secret w. In this manner, aspects of the invention provide visibility into the secret reconstruction process.

According to another aspect of the invention, in at least one embodiment, the verifiable proof permits audited access control, where access to a protected resource is provided and the history of access is recorded in the form of verifiable proofs of the reconstruction type used to reconstruct the secret. In one exemplary embodiment, data is distinguished between secure data and highly secure data. For secure data, the key-splitting protection permits key assembly in an offline mode or an online mode. For highly secure data, the key-splitting protection requires key assembly with a provable online access mode.

A number of exemplary secret sharing protocols are presented for verifiable reconstruction type, covering a large set of properties on sets of shares. In particular, the exemplary protocols support verification of the following properties over a set S of shares used for key reconstruction:

Special Share Inclusion: For a special share s* (e.g., "online" share provided by a designated corporate authentication server), it holds that s*∈S. See, Section entitled "Single Special Share".

Representative Share: For a total number of n shares $S'=\{s_1, s_2, \ldots, s_n\}$ present in the key-splitting system, $s_S \in S$ where $s_S$ is the representative share of S, i.e., a well-defined most important share in S with respect to its access control capabilities. For instance, under the convention that shares in S' are ranked in an order denoting increasing access control capabilities (e.g., $s_j$ provides more access to the resource than $s_i$ if j>i), then $s_S$ can be defined to be the share in S of maximum rank; e.g., $s_S=s_6$ for $S=\{s_2, s_4, s_6\}$). More generally, a reconstruction set S may have more than one representative share which may correspond to different access control capabilities, and in general different access control capabilities may be assigned to proofs that indicate that different combinations of representative shares were used in the reconstruction of the secret. See, Section entitled "Arbitrary Single Share".

Special Subset Inclusion: For a special subset of shares S* (e.g., "corporate" shares provided by designated corporate authentication servers), it holds that S*⊆S. See, Section entitled "A Special Subset".

Full Reconstruction Type: For any set S={$s_{m_1}, s_{m_2}, \ldots, s_{m_j}$}, the full set S is disclosed, i.e., proving all specific shares used in reconstruction of the key. See, Section entitled "Arbitrary Qualified Set".

The above properties are supported by employing techniques on polynomial evaluation verifiability. Additionally, techniques are presented for providing negative proofs, i.e., that one special share was not used during key reconstruction (see, Section entitled "Negative Proof for a Special Share"), as well as extensions for proving share freshness using secret sharing proactivization methods (see, Section entitled "Share Freshness").

One or more exemplary reconstruction proofs constructed by the presented protocols are succinct, i.e., have short size, thus enhancing the practicality of employing the disclosed techniques into practical applications.

As discussed further below in conjunction with FIG. 3, a dealer $\mathcal{D}$ sets up identifiers i for hidden shares and information for proving a correct polynomial evaluation of a function $f$. A reconstructor $\mathcal{R}$ constructs a compact proof indicating that the reconstructor knows $f(i^*)$. A checker entity $\mathcal{C}$ verifies that $f(i^*)$ equals s* (proof) is correct.

The disclosed exemplary protocols find applications in the following exemplary key-splitting models:

Layered Access Control: Based on the exact reconstruction type proved by a reconstructor entity $\mathcal{R}$ to checker entity $\mathcal{C}$, different levels of service are provided by $\mathcal{C}$ to $\mathcal{R}$ related to the protected resource.

Visibility of Delegated Secret Reconstruction: $\mathcal{C}$ outsources reconstruction of secret to entity $\mathcal{R}$ and is provided with visibility on the exact secret reconstruction via verifiable reconstruction-type proofs.

Back-Door/Emergency Reconstruction Detection: $\mathcal{C}$ checks that all accesses to a given resource are of normal type and no back-door or emergency reconstruction was used by $\mathcal{R}$ (e.g., by using "back-up" shares stored at a special recovery server, or by using special "emergency" shares stored at a highly-protected environment that potentially managed, enforced and used by law-enforcement agencies).

Audited Access Control: Access to the resource is provided to $\mathcal{R}$ by $\mathcal{C}$ but the exact history of access is recorded in an audit log in the form of verifiable proofs of the exact reconstruction type used by $\mathcal{R}$.

Additional application areas can be considered by combining the disclosed protocols with threshold password-based secret sharing.

Secret Sharing Schemes

A secret sharing scheme is a pair of algorithms (Share, Rec) that allows the sharing of a secret Y into a number of shares, or sharing, S={$s_1, s_2, \ldots, s_n$}, which are distributed to a number of entities, or parties, P={$p_1, p_2, \ldots, p_{n'}$}, n'≤n, so that each party collectively receives at least one share, such that reconstruction of secret Y is allowed from at least one subset of shares, only under certain conditions on this subset being met. Such conditions on subsets of shares that allow secret reconstruction may depend on the subset size or generally on the exact members of the subset, i.e., on the exact combination of shares and, therefore, on a corresponding combination of parties. These conditions are typically expressed by an access structure (AS) that characterizes the exact subsets of shares, or corresponding subset of parties, that allow reconstruction of the secret for a given scheme. Any such subset in the access structure of a scheme is often called an authorized set of shares or parties. Then, a secret sharing scheme should necessarily limit secret reconstruction only to authorized sets in its access structure and disallow secret reconstruction from any subset of shares or parties not in its access structure.

Generally, a secret sharing scheme can support an arbitrary such set of conditions defined by an access structure AS containing authorized sets of parties that result from any set-operation formula over the parties in P={$p_1, p_2, \ldots, p_n$}. For instance, $$AS=\{\{p_1 \cup p_2\}, \{(p_1 \cup p_2 \cup p_3) \cap (p_2 \cup p_3 \cup p_4)\}\}.$$

Often, for secret sharing to be more efficient and secret reconstruction conditions to be meaningful, the access structure should be expressed by a monotone formula, so that, for instance, if subset {$p_2, p_3$} is included in AS, then all proper supersets of it are also included. It is noted that there is little value and no security justification for a scheme to allow reconstruction for authorized set {$p_2, p_3$} but to disallow reconstruction once a new member $p_4$ is added in this set; for example, the unauthorized set {$p_2, p_3, p_4$} would trivially (and insecurely) become authorized by silently excluding party $p_4$ from secret reconstruction. For a monotone access structure, an authorized set $A_i$ is called minimal if any proper subset of $A_i$ is not an authorized set. For instance, set {$p_2, p_3$} in the above example is minimal when the access structure additionally requires at least two parties for secret construction.

Threshold Schemes

Threshold secret sharing schemes are special schemes with corresponding access structures where reconstruction depends only on the number of available parties (or combined shares), namely by including only authorized sets of a size of at least a given threshold value. Specifically, in a typical (t, n) or t-out-of-n secret sharing scheme, 2≤t≤n, the secret is split into n shares where each party $p_i$ is provided with exactly one share $s_i$, and secret reconstruction is allowed by any set of parties (equivalently, set of shares) of size t or more, that is, any set reaching a size of the reconstruction threshold value t.

Shamir's Secret Sharing Scheme is the most widely used threshold scheme and is based on polynomials. Here, given a secret Y in the appropriate range, a random polynomial $f(\bullet)$ of degree t−1 is chosen by selecting randomly and independently t−1 polynomial coefficients so that $f(0)=Y$, where arithmetic modulo a (large) prime of an appropriate length is used to evaluate the polynomial, and the produced sharing takes the form S={$s_i=(i, f(i))|i\in[1:n]$}. Then, secret reconstruction is allowed through polynomial interpolation (and evaluation of $f(0)$) for any subset of shares of a size of at least t, based on the fact that any k points uniquely define a polynomial of degree (at most) k−1 passing through all these points. Shamir's scheme is both ideal (that is, each share is of size exactly the size of the secret) and perfectly private (that is, any unauthorized set of at most t−1 shares learns nothing about the secret in an information-theoretic sense).

Overall, existing secret sharing schemes generally produce shares that are randomly and independently selected other than satisfying the final secret reconstruction condition.

Password-Based Secret Sharing Schemes

U.S. patent application Ser. No. 14/577,206, (now U.S. Pat. No. 9,455,968), and U.S. patent application Ser. No.

14/672,507, (now U.S. Pat. No. 9,813,243), both referenced above, describe password-based secret sharing (or PBSS) schemes. U.S. patent application Ser. No. 14/577,206, (now U.S. Pat. No. 9,455,968), for example, describes a password-based key-splitting scheme for user credential protection in mobile computing settings. Generally, one cryptographically strong key is employed for protecting sensitive data, where this key is split into two or more shares dispersed among a set of devices, such as mobile devices, smart objects and/or online servers. Access to data protected by such a split key is granted only through the reconstruction of this split key, where (typically for security and usability reasons) one of the employed shares can receive a fixed value which is associated with or derived by some predetermined, possibly private, information related to the user (e.g., a password). For instance, if Shamir's (t, n) threshold secret sharing scheme is used for splitting the key into n shares, a combination of any t, or more, such shares is necessary to reconstruct the key, but now one of the shares may be user-defined and provided directly by the user. Overall, both security and usability are improved by leveraging splitting of a cryptographic key into a number of individually managed and protected shares, to provide stronger resilience against device compromises and state leakage, and by associating at least one of these shares with a user password (or personal identification number (PIN) or another user-defined secret), to allow reconstruction of the split key conditioned on the knowledge of such password (or other user-defined secret information).

U.S. patent application Ser. No. 14/672,507, (now U.S. Pat. No. 9,813,243), provides a threshold password-based secret sharing (PBSS) scheme that is an extension of Shamir's sharing scheme that securely supports fixed shares, i.e., it allows for one or more shares to be selected according to some predetermined values.

Both PBSS schemes satisfy the following property: During the sharing phase, one or more of the shares, into which a given secret is split, can take on some predetermined fixed values that can be provided as additional inputs to the secret sharing algorithm, without otherwise affecting the security of the scheme or its functionality during the secret reconstruction phase. Notably, using the design framework of U.S. patent application Ser. No. 14/577,206, (now U.S. Pat. No. 9,455,968), referenced above, these PBSS schemes find application to credential protection in mobile settings, as mentioned above. Without a PBSS scheme, no such association is possible, since conventional (non-password based) schemes split a secret into a number of shares that are all completely random, thus not allowing setting any share to a predetermined fixed user-defined value.

The threshold PBSS scheme, as discussed further below in conjunction with FIG. 1, is an extension of Shamir's (t, n) threshold Secret Sharing Scheme that allows the secure selection of one or more shares, called fixed shares, in accordance with a set of corresponding predetermined fixed values, which are provided as additional inputs to the secret sharing algorithm. In one more more exemplary embodiments, the selected fixed shares are fully consistent with the secret reconstruction condition and the extended scheme remains both ideal and perfectly private. This is in direct contrast of the standard Shamir's scheme, where all shares are randomly selected only subject to the secret reconstruction condition $f(0)=Y$. By introducing one or more (up to an upper bound that depends on n and t) fixed shares in Shamir's (t, n) scheme, the construction appropriately adjusts the underlying polynomial in a way that maintains the consistency between the fixed shares and the secret reconstruction condition, while keeping its ideal sharing and perfect privacy properties. The selection of fixed shares (according to corresponding predetermined fixed values) is traded with a corresponding adjustment of the polynomial coefficients. In one or more exemplary embodiments, such adjustments are performed to maintain the scheme's secure configuration, that is, to ensure that the secret remains both reconstuctable and perfectly hidden from any below-the-threshold coalition. Specifically, every additional fixed share that is introduced in the scheme is "tolerated," with respect to the two goals of secret reconstruction and perfect privacy, by appropriately setting a corresponding polynomial coefficient to a particular value that depends on the fixed share.

Consider Shamir's (3,5), discussed further below in conjunction with FIG. 2, threshold scheme where secret Y is shared among parties $P=\{p_1, p_2, p_3, p_4, p_5\}$ through sharing $S=\{s_1, s_2, s_3, s_4, s_5\}$, where any three or more shares suffice to reconstruct Y, but no pair of shares alone. Let p be the prime order of the finite field $Z_p$ over which the polynomials in Shamir's scheme are defined, where $Y<p$. Assume a desire to support selection of one predetermined fixed share, say $s_1$, that is associated with party's $p_1$ secret information. For instance, a password $\pi$ is first selected by party $p_1$ and then the associated share $s_1$ is computed by applying an appropriate transformation function, e.g., mapping $\pi$ to an element in $Z_p$. Shamir's scheme is extended as follows, so that $s_1$ can be securely associated with $\pi$ and, at the same time, the scheme remains ideal and perfectly private:

1. Password Share: Map password $\pi$ to an element $\Pi=h(\pi)\in Z_p$ by applying an appropriate compressed-range function $h:\{0,1\}^*\to\{Z_p\}$. Here, function h may be a cryptographic collision-resistant hash function h or an appropriate key derivation function.

2. Polynomial Initialization: Initiate an underlying polynomial $f$ of degree most 2 as follows:

$$f(x)=a_0+a_1x+a_2x^2 \bmod p.$$

3. Polynomial Randomization: Choose a random integer $a_2<p$ from $Z_p$, i.e., $a_2 \xleftarrow{\$} \mathbb{Z}_p$.

4. Secret-Reconstruction Condition: Set $a_0=Y$.

5. Fixed-Share Condition: Choose $a_1$ such that $f(1)=\Pi$, or $\Pi=a_0+a_1+a_2 \bmod p$, that is, set $$a_1=\Pi-Y-a_2 \bmod p.$$

6. Final Sharing: Produce shares as $$S=\{(i,f(i))|i\in[1:5]\},$$

where the coefficients $a_0$, $a_1$ and $a_2$ of polynomial $f(x)=a_0+a_1x+a_2x^2 (\bmod p)$ are set as above.

In the general case, the PBSS scheme supports selection of k fixed shares (where k is appropriately bounded as described below), say shares $\{s_{I_1}, s_{I_2}, \ldots, s_{I_k}\}\subset S$, where each such share $s_{I_j}$ is associated with party's $p_{I_j}$ secret information or password $\pi_{I_j}$, as shown below:

1. Fixed Shares: Choose (possibly randomly) k indices $I=\{I_1, I_2, \ldots, I_k\}\subset[1:n]$ that will correspond to the fixed shares, where $0\le k<t-1$. For each $I_j\in I$, map password $\pi_{I_j}$ to an element $\Pi_{I_j}=h(\pi_{I_j})\in Z_p$ by applying an appropriate compressed-range function $h:\{0,1\}^*\to\{Z_p\}$. Here, function h may be a cryptographic collision-resistant hash function h or an appropriate key derivation function.

2. Polynomial Initialization: Initiate an underlying polynomial $f$ of degree at most $t-1$ as follows:

$$f(x)=a_0+a_1x+\ldots+a_{t-1}x^{t-1} \bmod p.$$

3. Polynomial Randomization: Choose independently at random $t-k-1>0$ integers $a_{k+1}, \ldots, a_{t-1}$ from $Z_p$, i.e., $a_i \xleftarrow{\$} Z_p$, for $i\in[k+1:t-1]$.

4. Evaluation Conditions:
(a) Form set of equations E={$E_0, E_2, \ldots, E_k$}, each of the form $$Y_x = f(x) = a_0 + \sum_{1 \le i \le t-1} a_i x^i \bmod p,$$

in 1-1 correspondence to the following conditions on:
* Secret-reconstruction: $Y = f(0) \triangleq Y_0$;
* Fixed-shares: $\Pi_{I_j} = f(I_j) \triangleq Y_{I_j}$, for each index in {$I_1, I_2, \ldots, I_k$}.
(b) View equations E as system $Y = A \cdot I$, where $Y = [Y_0 \ Y_{I_1} \ldots Y_{I_k}]^T$, $I = [a_0 \ a_1 \ldots a_k]^T$ and A takes the form A= [R S] as matrix:

$$A = \begin{bmatrix} 1 & 0 & \ldots & 0 & \ldots & 0 \\ 1 & I_1 & \ldots & I_1^k & \ldots & I_1^{t-1} \\ \vdots & & & & & \\ 1 & I_k & \ldots & I_k^k & \ldots & I_k^{t-1} \end{bmatrix},$$

set $\bar{I} = [a_{k+1} \ a_{k+2} \ldots a_{t-1}]^T$ and finally set $I = R^{-1} \cdot (Y - S \cdot \bar{I})$.

5. Final Sharing:
(a) Produce shares as $$S = \{s_i \triangleq (i, f(i)) | i \in [1:n]\},$$

where the coefficients $a_0, a_1, \ldots a_{t-1}$ of polynomial $f(x) = a_0 + a_1 x + \ldots + a_{t-1} x^{t-1} \bmod p$ are set as above (in steps 3 and 4(b)).
(b) Provide party $p_i$ with share $(s_i) = (i, f(i))$.

The password-based secret sharing algorithm above follows the structure of the previously discussed example. The underlying polynomial $f(x)$ is fully defined by t equations $E' = E \cup \{E_{k+1}, E_{k+2}, \ldots, E_{t-1}\}$ of the form as in step 4(a), which can be viewed as system $$[Y \ \bar{Y}]^T = [A \ \bar{A}]^T \cdot [I \ \bar{I}]^T,$$

where $\bar{Y} = [Y_{k+1} \ Y_{k+2} \ldots Y_{k-1}]^T$, $$\bar{A} = \begin{bmatrix} 1 & I_{k+1} & \ldots & I_{k+1}^k & \ldots & I_{k+1}^{t-1} \\ 1 & I_{k+2} & \ldots & I_{k+2}^k & \ldots & I_{k+2}^{t-1} \\ \vdots & & & & & \\ 1 & I_{t-1} & \ldots & I_{t-1}^k & \ldots & I_{t-1}^{t-1} \end{bmatrix},$$

and $\bar{I}$ as defined above in step 4(b). Then, step 3 randomly sets t−k−1 coefficients (the remaining degrees of freedom of the randomness of the scheme given the k+1 conditions related to secret reconstruction and fixed shares), and step 4(b) essentially solves the system by computing the remaining k+1 unspecified coefficients in I. Note that matrix R is invertible as a Vandermonde matrix. This proves the correctness of the scheme.

Moreover, it is possible to show that the threshold scheme above is also perfectly private. Intuitively, an attacker holding t−1 points of the polynomial $f(x)$ will determine, for each candidate secret Y', a unique polynomial $f'(x)$ (that depends on Y, Y' and all fixed shares/passwords), and each one of these p polynomials can occur with the same probability $1/p^{t-k-1}$.

FIG. 1 illustrates an exemplary password-based secret sharing technique 100. As noted above, the PBSS scheme is an extension of Shamir's (t, n) threshold Secret Sharing Scheme that allows the secure selection of one or more shares, called fixed shares, in accordance with a set of corresponding predetermined fixed values, which are provided as additional inputs to the secret sharing algorithm.

As shown in FIG. 1, a key 110 (or other secret information) and a user password 120 are applied to a Shamir secret sharing scheme 130, such as a (2, 3) scheme. The exemplary (2, 3) scheme splits the exemplary key 110 into three shares. In the embodiment of FIG. 1, the key 110 is split into two non-fixed shares 150-1 and 150-2, and one fixed share 150-3, referred to as a password share. The password share 150-3 is obtained, for example, by applying a hash function, h, to the user password 120. The password share 150-3 is typically not explicitly stored.

Figure 2:
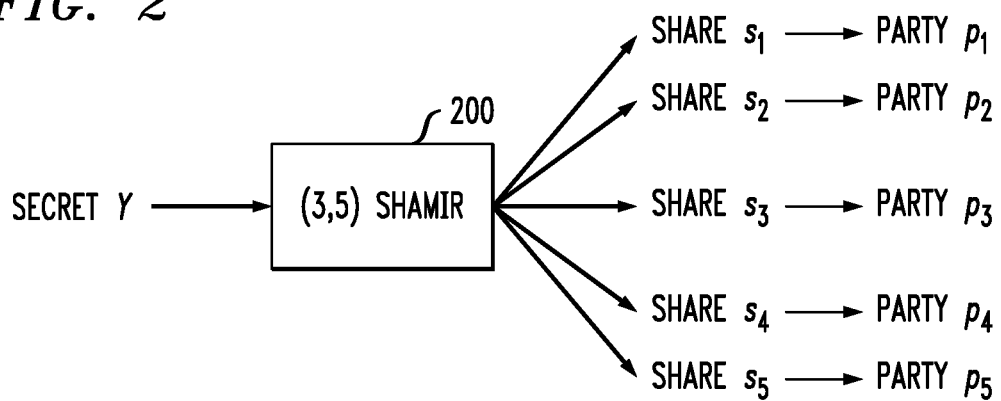
FIG. 2 illustrates an exemplary Shamir's (3,5) threshold scheme where secret Y is shared among a plurality of parties through an initial secret sharing.

FIG. 2 illustrates an exemplary Shamir's (3,5) threshold scheme 200, where secret Y is shared among parties P={$p_1, p_2, p_3, p_4, p_5$} through initial sharing S={$s_1, s_2, s_3, s_4, s_5$}, where any three or more shares suffice to reconstruct Y, but no pair of shares alone.

Reconstruction Verification Preliminaries

Bilinear Pairings. Let $\mathbb{G}$, $\mathbb{G}_T$ be two cyclic multiplicative groups of order p generated by $g \in \mathbb{G}$ and such that there exists a map $e: \mathbb{G} \times \mathbb{G} \to \mathbb{G}_T$ with the following properties: (1) Bilinearity: $e(P^a, Q^b) = e(P, Q)^{ab}$ for all P, Q∈$\mathbb{G}$ and a, b∈$\mathbb{Z}_p$; (2) Non-Degeneracy $e(g, g) \ne 1$; (3) Computability: There is an efficient algorithm to compute e(P, Q) for all P, Q∈$\mathbb{G}$. pub=(p, $\mathbb{G}$, $\mathbb{G}_T$, e, g)←BilGen($1^k$) denotes the bilinear pairings parameters, output by a probabilistic polynomial time (PPT) algorithm BilGen on input $1^k$.

Model

Figure 3:
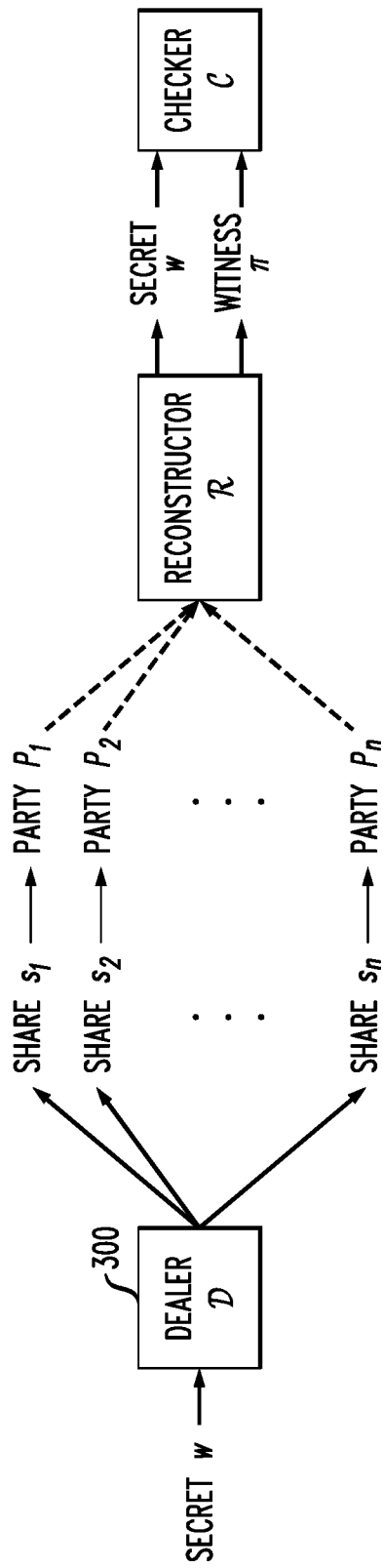
FIG. 3 illustrates the exemplary parties in the exemplary secret sharing with reconstruction verification model.

FIG. 3 illustrates the exemplary parties in the model. As shown in FIG. 3, a dealer $\mathcal{D}$ 300 generates n shares $s_1, \ldots, s_n$ for a secret w and distributes the n shares to n parties also referred to herein as players $P_1, \ldots, P_n$. A reconstructor $\mathcal{R}$ collects shares from one or more players and reconstructs the secret w. In addition, the reconstructor $\mathcal{R}$ generates a witness π (also referred to herein as a proof) to prove that the shares used to reconstruct the secret satisfy a certain property. A checker $\mathcal{C}$ checks the correctness of the secret and the witness. The checker and the dealer can optionally be merged into one party, but the checker may be granted less trust.

In one or more exemplary embodiments considered herein, a (t, n) threshold secret sharing scheme is considered where a reconstructor with t or more shares can reconstruct the secret, while an adversary with t−1 or less shares essentially learns no information about the share. In addition, in one or more exemplary embodiments, an adversary with shares not satisfying the property cannot construct a valid witness.

Constructions

Single Special Share

Problem Statement. In a secret sharing scheme, the reconstuctor wants to prove whether a special share from player $P_l$ is used during the secret reconstruction.

FIG. 4 is a table illustrating the functionality of each party of FIG. 3 for an exemplary Single Special Share scheme 400. As shown in FIG. 4:

$\mathcal{D}$: Dealer runs pub=(p, $\mathbb{G}$, $\mathbb{G}_T$, e, g)←BilGen($1^k$). Dealer selects a polynomial $f(x)$ of degree t−1 where $f(0)$=w and n random IDs $e_1, \ldots, e_n \in \mathbb{Z}^*_p$. It sets $s_i = f(e_i)$, ∀i and sends $(e_i, s_i)$ to $P_i$ as its ID and share.

It selects $s \in \mathbb{Z}_p^*$ randomly and publishes pk=pub, $g^s, \ldots, g^{s^q}$ as the public key. It sends w, $g^{e_i}$, $g^{s_i}$, $g^{f(s)}$ to the checker $\mathcal{C}$.

Players: each player keeps its ID and share secret.

$\mathcal{R}$ : Reconstructor collects t or more pairs of ID and share from players. Reconstructor reconstructs $f(x)$ by polynomial interpolation. When Reconstructor has access to pair $(e_l, s_l)$, Reconstructor computes the polynomial $q(x)=(f(x)-s_l)/(x-e_l)$ by polynomial division and sets the witness $\pi=g^{q(s)}$ using pk. Reconstructor sends the key and the witness w, $\pi$ to the checker.

$\mathcal{C}$ : Checker stores w, $g^{e_i}$, $g^{s_i}$, $g^{f(s)}$. Upon receiving w*, $\pi$ from the reconstructor, Checker checks w* and $e(g^{f(s)-s_l}, g)e(g^{s-e_l}, \pi)$.

Security:

There is a unique $q(x)$ for any value of $e_l$. By the second check, $\pi=g^{q(s)}$, thus the reconstructor must know $q(x)$. With the first check, the reconstructor must know $f(x)$, and thus knows $e_l$, $s_l$.

The checker $\mathcal{C}$ does not have access to either $f(x)$, $e_l$ or $s_l$. It may not need to know w if it stores h=H(w) and checks H(w*), where H(•) is a cryptographic hash function.

Complexity:

The computational complexity of the reconstructor is O(t log t), the communication complexity between the reconstructor and the checker is O(1), the storage and the verification complexity of the checker is O(1). The size of the public key pk is O(t) (i.e. q=t).

Arbitrary Single Share

Problem Statement. In a secret sharing scheme, the reconstuctor wants to prove whether a particular share from player $P_i$ is used during the secret reconstruction for all i. This property can be applied to grant n layers of privileges, which motivates the reconstructor to prove his access to the share from $P_i$ with maximum i.

FIG. 5 is a table illustrating the functionality of each party of FIG. 3 for an exemplary Arbitrary Single Share scheme 500. As shown in FIG. 5:

$\mathcal{D}$ : Dealer runs pub=(p, $\mathbb{G}$, $\mathbb{G}_T$, e, g)←BilGen($1^k$). Dealer selects a polynomial $f(x)$ of degree t-1 where $f(0)$=w. Dealer selects a seed sk and sets $e_i$=PRF(sk, i) and $s_i=f(e_i)$, $\forall i$ and sends $(e_i, s_i)$ to $P_i$ as its ID and share. Dealer selects $s \in \mathbb{Z}_p^*$ randomly and publishes pk=pub, $g^s, \ldots, g^{s^q}$ as the public key. It sends w, sk, $g^{f(s)}$ to the checker $\mathcal{C}$.

Players: each player keeps its ID and share secret.

$\mathcal{R}$ : Reconstructor collects t or more pairs of ID and share from players. Reconstructor reconstructs $f(x)$ by polynomial interpolation. To prove the access to pair $(e_i, s_i)$, Reconstructor computes the polynomial $q_i(x)=(f(x)-s_i)/(x-e_i)$ by polynomial division and sets the witness $\pi_1=g^{s_i}$, $\pi_2=g^{q_i(s)}$ using pk. Reconstructor sends the key w, the claimed index i and the witness $\pi_1$, $\pi_2$ to the checker.

$\mathcal{C}$ : It stores w, sk, $g^{f(s)}$. Upon receiving w*, i, $\pi_1$, $\pi_2$ from the reconstructor, Checker computes $e_i$=PRF(sk, i) and checks w* and $e(g^{f(s)}/\pi_1, g)e(g^{s-e_i}, \pi_2)$.

Security:

The security is based on the security of the scheme to verify the value of a polynomial in the exponent evaluated at a certain point, proposed by C. Papamanthou et al., "Signatures of Correct Computation, in *Theory of Cryptography*, pages 222-242 (Springer, 2013).

The checker $\mathcal{C}$ does not have access to either $f(x)$, $s_l$, but has access to all $e_i$s.

Complexity:

The computational complexity of the reconstructor is O(t log t), the communication complexity between the reconstructor and the checker is O(1), the storage and the verification complexity of the checker is O(1). The size of the public key pk is O(t) (i.e. q=t).

A Special Subset

Problem Statement. In a secret sharing scheme, the reconstructor wants to prove whether a predetermined subset of shares $\{s_{l_1}, \ldots, s_{l_m}\}$ are used during the secret reconstruction.

FIG. 6 is a table illustrating the functionality of each party of FIG. 3 for an exemplary Special Subset scheme 600. As shown in FIG. 6:

$\mathcal{D}$ : Dealer runs pub=(p, $\mathbb{G}$, $\mathbb{G}_T$, e, g)←BilGen($1^k$). Dealer selects a polynomial $f(x)$ of degree t-1 where $f(0)$=w and n random IDs $e_1, \ldots, e_n \in \mathbb{Z}_p^*$. Dealer sets $s_i=f(e_i)$, $\forall i$ and sends $(e_i, s_i)$ to $P_i$ as its ID and share. Dealer selects $s \in \mathbb{Z}_p^*$ randomly and publishes pk=pub, $g^s, \ldots, g^{s^q}$ as the public key. Dealer sends $$w, g^{\prod_{i=1}^{m}(f(s)-s_{l_i})}, g^{\prod_{i=1}^{m}(s-e_{l_i})}$$

to the checker $\mathcal{C}$.

Players: each player keeps its ID and share secret.

$\mathcal{R}$ : Reconstructor collects t or more pairs of ID and share from players. Reconstructor reconstructs $f(x)$ by polynomial interpolation. When Reconstructor has access to all pairs in $\{(e_{l_1}, s_{l_1}), \ldots, (e_{l_m}, s_{l_m})\}$, Reconstructor computes the polynomial $q_i(x)=(f(x)-s_{l_i})/(x-e_{l_i})$ for i=1,…, m by polynomial division and sets the witness $\pi=g^{\prod_{i=1}^{m} q_i(s)}$ using pk. Reconstructor sends the key and the witness w, $\pi$ to the checker.

$\mathcal{C}$ : Checker stores $$w, g^{\prod_{i=1}^{m}(f(s)-s_{l_i})}, g^{\prod_{i=1}^{m}(s-e_{l_i})}.$$

Upon receiving w*, $\pi$ from the reconstructor, Checker checks w* and $$e\left(g^{\prod_{i=1}^{m}(f(s)-s_{l_i})}, g\right) e\left(g^{\prod_{i=1}^{m}(s-e_{l_i})}, \pi\right).$$

Security:

There is a unique $q_i(x)$ for any value of $e_{l_i}$. By the second check, the reconstructor must know all $q_i(x)$. With the first check, the reconstructor must know $f(x)$, and thus knows all $(e_{l_i}, s_{l_i})$.

Complexity:

The computational complexity of the reconstructor is O(mt log t), the communication complexity between the reconstructor and the checker is O(1), the storage and the verification complexity of the checker is O(1). The size of the public key pk is O(mt) (i.e. q=mt).

Arbitrary Qualified Set

Problem Statement. In a secret sharing scheme, the reconstructor wants to prove which qualified set is used during the secret reconstruction.

FIG. 7 is a table illustrating the functionality of each party of FIG. 3 for an exemplary Arbitrary Qualified Set scheme 700. As shown in FIG. 7:

$\mathcal{D}$ : Dealer runs pub=(p, $\mathbb{G}$, $\mathbb{G}_T$, e, g)←BilGen($1^k$). Dealer selects a polynomial $f(x)$ of degree t-1 where $f(0)=w$ and n random IDs $e_1, \ldots, e_n \in \mathbb{Z}^*_p$. Dealer sets $s_i=f(e_i)$, $\forall i$ and sends $(e_i, s_i)$ to $P_i$ as its ID and share. Dealer selects $s \in \mathbb{Z}^*_p$ randomly and publishes pk=pub, $g^s, \ldots, g^{s^q}$ as the public key. It sends w, $f(x)$, $e_1, \ldots, e_n, s_1, \ldots, s_n$ to the checker $\mathcal{C}$.

Players: each player keeps its ID and share secret.

$\mathcal{R}$: Reconstructor collects t or more pairs of ID and share from players. Reconstructor reconstructs $f(x)$ by polynomial interpolation. To prove the access to shares from a set of players $\{P_{l_1}, \ldots, P_{l_t}\}$ of size t, Reconstructor computes $q_i(x)=(f(x)-s_i)/(x-e_i)$ for $i \in \{l_1, \ldots, l_t\}$ through polynomial division. Reconstructor computes the polynomial $q(x)=\Pi_{i=l_1}^{l_t} q_i(x)$ by Fast Fourier Transform (FFT). Reconstructor sets the witness $\pi=g^{q(s)}$. Reconstructor sends w, an n-bit binary S string to indicate the set it claims to have access to, and $\pi$ to the checker. (Alternatively, it can send t numbers to indicate the set).

$\mathcal{C}$: Checker stores w, $f(x)$, $e_1, \ldots, e_n, s_1, \ldots, s_t$. Upon receiving w*, S, $\pi$ from the reconstructor, Checker fetches the ID/share pairs $(e_i, s_i)$ for $i=l_1, \ldots, l_t$ indicated by S. Checker computes $F(x)=\Pi_{i=l_1}^{l_t}(f(x)-s_i)$ and $E(x)=\Pi_{i=l_1}^{l_t}(x-e_i)$. Checker computes $g^{F(s)}$ and $g^{E(s)}$ using pk. It checks w* and $e(g^{F(s)}, g)e(g^{E(s)}, \pi)$ Security:

There is a unique q(x) for any value of $e_i$. By the second check, $$\pi = g^{\Pi_{i=l_1}^{l_t} q_i(s)},$$

thus the reconstructor must know $\Pi_{i=i_1}^{l_t} q_i(x)$. With the first check, the reconstructor must know $f(x)$, and thus knows all $e_i, s_i$ for $i \in \{l_1, \ldots, l_t\}$.

The checker $\mathcal{C}$ has access to $f(x)$ and all $(e_i, s_i)$s.

Complexity:

The computational complexity of the reconstructor is $O(t^2 \log t)$, the communication complexity between the reconstructor and the checker is n+O(1) (or t log n+O(1)). This is always necessary to indicate the set it claims, and the communication complexity is smaller than sending all t shares, which is O(t log p) (p>>n). The storage of the checker is O(n) and the verification complexity is $O(t^2 \log t)$. It can be improved to O(t) if the checker stores the secret key s. The size of the public key pk is $O(t^2)$ (i.e. $q=t^2$).

Negative Proof for a Special Share

In addition to a proof that a special share $s_l$ is used during the reconstruction, it is also desired to have a negative proof that it is not used. This proof can be used as a record on the server side. We propose to potential directions to achieve it.

Secret Sharing:

As we have the minimum qualified set assumption, to prove that $s_l$ is not involved during the reconstruction, it is sufficient to prove that the reconstructor has access to t shares other than $s_l$. Therefore, we can simply deploy another (t, n−1) secret sharing scheme with another secret $w_2$, where the n−1 parties are the original n parties except $P_l$. This $w_2$ is the negative proof, as whenever it is reconstructed, t shares other than $s_l$ must be accessed.

However, we also want this new secret sharing scheme for $w_2$ to distribute the same share for each party $P_i$, $i \in \{1, \ldots, n\}\setminus\{l\}$. This is only achievable if the degree of the polynomial is raised to n and n−t+1 public shares are published. How to reduce the size of the public information is an open problem.

Set Membership/Non-Membership:

Another direction is to prove that the reconstructor has a set of t shares and the share $s_l$ does not belong to this set. The protocol is as following: the reconstructor sends the secret w together with a digest d to the checker. The checker checks if the secret is correct and the digest is valid for a subset of shares of size t. The checker then sends the share $s_l$ as a challenge and the reconstructor sends a non-membership proof for $s_l$. If this proof is verified using d, $s_l$ is proved to be not used during the reconstruction. However, how to verify a digest d of constant size is valid for a subset of share of size t is an open problem.

Share Freshness

To guarantee that shares are collected during the reconstruction instead of previously stored, one exemplary embodiment employs centralized proactivization. The protocol is as follows:

$\mathcal{R}$ sends a request to $\mathcal{C}$ claiming that he or she wants to reconstruct the secret. $\mathcal{C}$ sends back to $\mathcal{R}$. $Enc_{sk}(r)$, a random number encrypted by a secret key sk that are known to all parties, but not $\mathcal{R}$.

$\mathcal{R}$ broadcasts $Enc_{sk}(r)$ to all parties he or she has access to.

Each party i decrypts $Enc_{sk}(r)$ to get r, and obtains the polynomial $\delta(x)=a_1 x + a_2 x^2 + \ldots + a_{t-1} x^{t-1}$, where $a_i=PRF(r, i)$ for $i=1, \ldots, t-1$. Each party evaluates $\delta(e_i)$ and sends $(e_i, s_i + \delta(e_i))$ to $\mathcal{R}$. Each party still keeps the original pair $(e_i, s_i)$ as its share.

$\mathcal{R}$ computes $g(\cdot)$ using the polynomial interpolation on the modified pairs $(e_i, s_i + \delta(e_i))$, and outputs the secret as g(0).

It is a centralized proactivization with a trusted checker and the coefficients of the random polynomial are compressed into one random number. See, for example, U.S. patent application Ser. No. 14/962,606, entitled "Proactivized Threshold Password-Based Secret Sharing with Flexible Key Rotation," filed Dec. 8, 2015, (now U.S. Pat. No. 10,804,596), and incorporated by reference herein. In this way, the old shares are independent of the new shares and the reconstructor cannot gain anything using storage. This scheme can optionally be applied on top of all prior schemes, as the update polynomial is known to the checker and will be known by the reconstructor with t shares.

It is noted that the encrypted random value r above serves as a fresh challenge provided by the checker. In response to this challenge, the parties that are accessed by the reconstructor provide their refreshed shares to the reconstructor, where these refreshed shares comprise a fresh new sharing of the secret. In particular, the new sharing is a random transformation (e.g., a modification) of an old (current) sharing of the secret, where this transformation remains secret for the reconstructor.

It is also noted that there are alternative options for such proactivization to be performed based on the random challenges derived by the checker. For instance, the checker may individually broadcast the encrypted value of r to all parties holding a share. Alternatively, challenges may be time-based, that is, the value of r may be depend on the secret shares by the checker with the parties and the current time (e.g., in the form of a sequence number indexing epochs of time). In this case, there is no need for explicitly broadcasting the encrypted challenge value r.

It is finally noted that, depending on the exact scheme in use, the above technique may be applied with or without the need to refresh (update) the information provided by the dealer to the checker during the setup phase of the exact scheme in use.

Details follow.

Detailed Challenge-Response Protocol for Guaranteeing Share Freshness:

To guarantee shares are collected during the reconstruction instead of previously stored, a solution is proposed using centralized proactivization. Applying on top of the scheme for arbitrary single share in the section entitled "Arbitrary Single Share," the protocol for secret reconstruction is as follows:

1. $\mathcal{R}$ sends a request to $\mathcal{C}$ claiming that $\mathcal{R}$ wants to reconstruct the secret. $\mathcal{C}$ sends back $Enc_{sk}(r)$, a random number encrypted by a secret key sk that are known to all parties, but not the requestor.

2. $\mathcal{R}$ broadcast $Enc_{sk}(r)$ to all parties $\mathcal{R}$ has access to.

3. Each party i decrypts $Enc_{sk}(r)$ to get r, and obtains the polynomial $\delta(x)=a_1x+a_2x^2+\ldots+a_{t-1}x^{t-1}$, where $a_i=PRF(r, i)$ for $i=1, \ldots, t-1$. The party evaluates $\delta(e_i)$ and sends $(e_i, s'_i=s_i+\delta(e_i))$ to $\mathcal{R}$. The party still keeps the original pair $(e_i, s_i)$ as its share.

4. $\mathcal{R}$ computes $g(\bullet)$ using the polynomial interpolation on the modified pairs $(e_i, s'_i)$, and outputs the secret as $w=g(0)$. To prove the access to the share of party i, $\mathcal{R}$ computes the polynomial $q'_i(x)=(g(x)-s'_i)/(x-e_i)$ by polynomial division and sets the witness $\pi_1=g^{s'_i}$, $\pi_2=g^{q'_i(s)}$ using pk. $\mathcal{R}$ sends the key w, the claimed index i and the witness $\pi_1, \pi_2$ to the checker.

5. $\mathcal{C}$ stores w, sk, $g^{f(s)}$. Using r, $\mathcal{C}$ computes the polynomial $\delta(x)=a_1x+a_2x^2+\ldots+a_{t-1}x^{t-1}$, where $a_i=PRF(r, i)$ for $i=1, \ldots, t-1$ and computes $g^{g(s)}=g^{\theta(s)}\cdot(g^s)^{a_1}\bullet\ldots\bullet(g^{s^{t-1}})^{a_{t-1}}$ using pk. Upon receiving w*, i, $\pi_1, \pi_2$ from the reconstructor, $\mathcal{C}$ computes $e_i=PRF(sk, i)$ and checks w* and $e(g^{g(s)}/\pi_1, g)e(g^{s-e_i}, \pi_2)$.

As noted above, it is a centralized proactivization with a trusted checker and the coefficients of the random polynomial are compressed into one random number. In this manner, the old shares are independent of the new shares and the reconstructor cannot gain anything using storage.

Applying the idea to the scheme for an arbitrary set in the section entitled "Arbitrary Qualified Set" is similar. Steps 1-3 remain the same as the protocol above, and the remaining steps are as follows:

$\mathcal{R}$ computes $g(\bullet)$ using the polynomial interpolation on the modified pairs $(e_i, s'_i)$, and outputs the secret as $w=g(0)$. To prove the access to shares from a set of players $\{P_{l_1}, \ldots, P_{l_t}\}$ of size t, $\mathcal{R}$ computes $q'_i(x)=(g(x)-s'_i)/(x-e_i)$ for $i\in\{1_r, \ldots, 1_t\}$ through polynomial division. $\mathcal{R}$ computes the polynomial $q'(x)=\Pi_{i=1}^{l_k}q'_i(x)$ by FFT. $\mathcal{R}$ sets the witness $\pi=g^{q'(s)}$. $\mathcal{R}$ sends w, an n-bit binary S string to indicate the set it claims to have access to, and $\pi$ to the checker. (Alternatively, $\mathcal{R}$ can send t numbers to indicate the set).

$\mathcal{C}$ stores w, $f(x)$, $e_1, \ldots, e_n$, $s_1, \ldots, s_l$. Using r, $\mathcal{C}$ computes the polynomial $\delta(x)=a_1x+a_2x^2+\ldots+a_{t-1}x^{t-1}$, where $a_i=PRF(r, i)$ for $i=1, \ldots, t-1$. Upon receiving w*, S, $\pi$ from the reconstructor, $\mathcal{C}$ fetches the IDs $e_i$ for $i=l_1, \ldots, l_t$ indicated by S. $\mathcal{C}$ computes the modified shares $s'_i=s_i+\delta(e_i)$ for $i=l_1, \ldots, l_t$. Let $g(x)=f(x)+\delta(x)$, $\mathcal{C}$ computes $G(x)=\Pi_{i=l_1}^{l_t}(g(x)-s'_i)$ and $E'(x)=Pi_{i=l_1}^{l_t}(x-e_i)$. $\mathcal{C}$ computes $g^{G(s)}$ and $g^{E'(s)}$ using pk. $\mathcal{C}$ checks w* and $e(g^{G(s)}, g)e(g^{E'(s)}, \pi)$.

This idea cannot be applied to schemes in the sections entitled "Single Special Share" and "A Special Subset" directly, as the identifiers (IDs) of the special share or subset of shares are not known to the checker, so that the checker cannot compute the modified shares using r. However, these schemes are special cases of the schemes in the sections entitled "Arbitrary Single Share" and "Arbitrary Qualified Set," thus they can be supported by the protocols described above, with a downgrade of security and complexity.

For the scheme in the section entitled "Single Special Share," if $g^{e_{i}}, \ldots, g^{e_{i}^{\beta}}$ are stored in the checker, then the checker can compute $g^{s'_i}=g^{s_i}\cdot g^{\delta(e_i)}$ using r, without knowing $e_i$, and the remaining portions of the scheme still work. With this modification, the storage of the checker becomes O(t), which is the same as the scheme for an arbitrary share in the section entitled "Arbitrary Single Share" (if t=O(n)). However, the checker does not have access to $e_i$.

Differentiated Data Access and Layered Access Control

Figure 8:
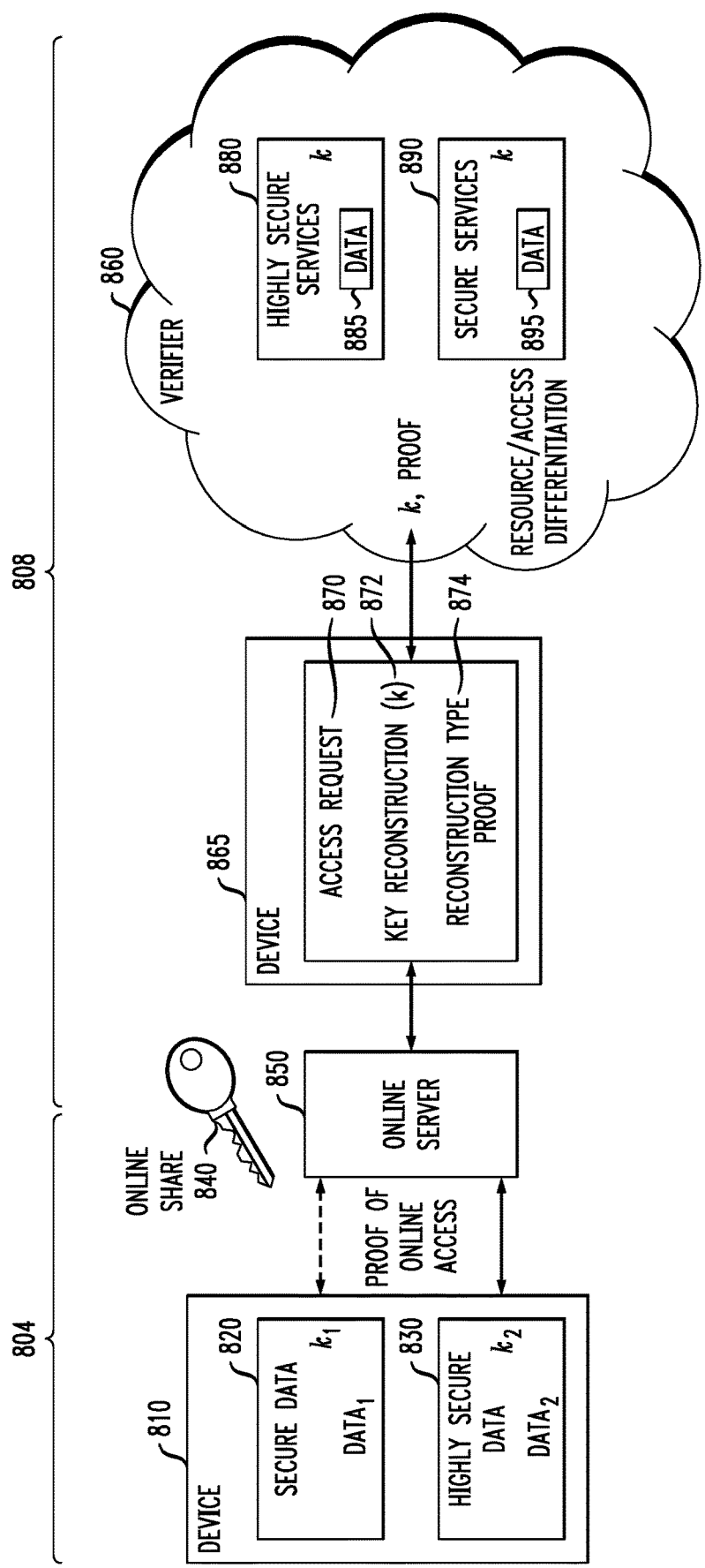
FIG. 8 illustrates an exemplary differentiated data access environment and a layered access control environment, where data can be protected as secure data and highly secure data according to one embodiment of the present invention.

As previously indicated and shown FIG. 8, the disclosed verifiable proofs support differentiated data access and a layered access control system, where access to a protected resource is provided via reconstruction of a split cryptographic key (used to protect, e.g., encrypt, the resource, e.g., a sensitive file), but this access is refined in a fine grain manner and eventually differentiated via the provided proofs of the type of reconstruction used to reconstruct the provided key. Optionally, the history of such differentiated or layered access to a protected resource is recorded in the form of verifiable proofs of the reconstruction type used to reconstruct the secret.

FIG. 8 illustrates an exemplary differentiated data access environment 804, where data on one or more devices, such as exemplary device 810, is distinguished between secure data 820 and highly secure data 830 based on the reconstruction of a corresponding split cryptographic key used to protect the stored data in combination with a proof of reconstruction of this key. FIG. 8 illustrates exemplary device 810 that stores data that is protected via cryptographic means using a corresponding secret key, whose access is differentiated with respect to the modes of operation of the host device 810 during the time an access request is issued by a user.

For secure data 820 protected via split key $k_1$, the key-splitting protection permits key assembly of key $k_1$, and thus access to data 820 in an offline mode or an online mode. As shown in FIG. 8, the secure data 820 is protected with an encryption key, $k_1$, that is split and shared according to a secret sharing scheme. For example, the secret sharing scheme may be a (2,3) secret sharing scheme, where any two of the following three shares may be used to reconstruct the encryption key, $k_1$: a device share, a password (fixed) share and an online share 840. The online share 840 is stored by an online server 850 that may optionally be a cloud-based server. See, for example, U.S. patent application Ser. No. 14/869,150, filed Sep. 29, 2015, (now U.S. Pat. No. 10,516, 527), entitled "Split-Key Based Crypto system for Data Protection and Synchronization Across Multiple Computing Devices," incorporated by reference herein.

For highly secure data 830 protected via split key $k_2$, the key-splitting protection requires key assembly with a provable online access mode. As shown in FIG. 8, the highly secure data 830 is protected with an encryption key, $k_2$, that is split and shared according to a secret sharing scheme. Similarly, key $k_2$ may be split using a (2,3) secret sharing scheme, where any two of the following three shares may be used to reconstruct the encryption key, $k_2$: a device share, a password (fixed) share and an online share, which may be the same as the online share 840. In one or more embodiments, encryption key, $k_1$, is derived from encryption key, $k_2$, (but not vice versa).

Upon a user wishing to get access to the data stored in the device 810, the corresponding key of the requested data must be reconstructed for the device 810 to unlock the requested data. Accordingly, during the secret reconstruction phase, device 810 receives an appropriate subset (i.e., pair) of shares (that is, a pair of shares that is authorized for reconstruction of the corresponding encryption key $k_1$ or $k_2$). If the reconstructed secret by the provided shares is $k_1$, then the secure data 820 can be accessed irrespectively of whether the device 810 operates in online or offline mode, even if the reconstruction used the online share. However, if the reconstructed secret by the provided shares is $k_2$, then the presented shares must indicate whether device 810 is in an offline or online mode, and access to the highly secure data 830 is provided only when the device 810 is in an online mode, which is in turn certified only if reconstruction of key $k_2$ occurs by using the online share 840 that is provided by the online server 850. This is achieved by having the device 810 engage in a protocol with online server 850, and further having secret $k_2$ reconstructed by the online server 850 and a proof identifying the online share 840 having been used in the reconstruction of $k_2$ generated by online server 850 and provided to the device 810. Then, the device 810, serving as a verifier, verifies the validity of the provided proof. If the proof verification is successful, then the device 810 can certify that indeed reconstruction of $k_2$ occurred using the online share 840 provided by the online server 850, which by convention is equivalent to certifying that the device 810 is in an online mode of operation, and access to the highly secure data 830 will be granted. Therefore, access to the highly secure data 830 is being granted if and only if the reconstruction of $k_2$ uses the online share 840, thus achieving differentiated data access based on the verification of an appropriately defined proof of reconstruction type.

Moreover, FIG. 8 illustrates an exemplary layered access control environment 808, where one or more devices, such as exemplary verifier 860 (e.g., a remote server that may operate, for example, as a cloud based storage provider), provides services distinguished between secure services 890 and highly secure services 880. Access to the services 880, 890 is based solely on the proof of reconstruction of an underlying split cryptograph key that is used to protect the stored data in combination with a proof of reconstruction of this key. For example, secure services 890 and highly secure services 880 may control access to secure data 895 and highly secure data 885, respectively, that is protected via cryptographic means using a corresponding secret key, whose access is differentiated with respect to the modes of operation of the host device 865 during the time an access request 870 is issued by a user.

For secure services 890 protected via split key k, the key-splitting protection permits key assembly of key k, and thus access to secure services 890 in an offline mode or an online mode. As shown in FIG. 8, the secure services 890 are protected with an encryption key, k, that is split and shared according to a secret sharing scheme. For example, the secret sharing scheme may be a (2,3) secret sharing scheme, where any two of the following three shares may be used to reconstruct the encryption key, k: a device share, a password (fixed) share and the online share 840. The online share 840 is stored by online server 850, as discussed above.

For highly secure services 880 protected via split key k, the key-splitting protection requires key assembly with a provable online access mode. As shown in FIG. 8, the highly secure services 880 are protected with an encryption key, k, that is split and shared according to a secret sharing scheme. Similarly, key k may be split using a (2,3) secret sharing scheme, where any two of the following three shares may be used to reconstruct the encryption key, $k_2$: a device share, a password (fixed) share and an online share, which may be the same as the online share 840.

When a user of the host device 865 issues an access request 870 for a service (any of 880 or 890), the key k protecting the protected resource offered by the requested service must be reconstructed for the device 865 to access the requested service. Accordingly, during the secret reconstruction phase, device 865 receives an appropriate subset (i.e., pair) of shares (that is, a pair of shares that is authorized for reconstruction of the corresponding encryption key k). If the access request 870 is for a secure service 890, then the secure services 890 can be accessed by the user irrespective of whether the device 865 operates in online or offline mode, even if the reconstruction used the online share 840.

However, if the access request 870 is for a highly secure service 880, then the presented shares must indicate whether device 865 is in an offline or online mode, and access to the highly secure service 880 is provided only when the device 865 is in an online mode, which is in turn certified only if reconstruction 872 of key k occurs by using the online share 840 that is provided by the online server 850. This is achieved by having the device 865 engage in a protocol with online server 850, and further having secret k reconstructed by the online server 850 and a proof 874 identifying the online share 840 having been used in the reconstruction of k generated by online server 850 and provided to the device 865. Then, the verifier 860 verifies the validity of the provided proof 874. If the proof verification is successful, then the verifier 860 can certify that indeed reconstruction of k occurred using the online share 840 provided by the online server 850, which by convention is equivalent to certifying that the device 865 is in an online mode of operation, and access to the highly secure services 880 will be granted. Therefore, access to the highly secure services 880 is being granted if and only if the reconstruction of k uses the online share 840, thus achieving layered access control based on the verification of an appropriately defined proof 874 of reconstruction type. It is noted that secure data 895 may be the same as highly secure data 885. However, highly secure services 880 are different than secure services 890. For instance, service 880 may be a superset of services 890, thus providing more access to a user Conclusion The foregoing applications and associated embodiments should be considered as illustrative only, and numerous other embodiments can be configured using the techniques disclosed herein, in a wide variety of different cryptography applications.

It should also be understood that the secret sharing with reconstruction verification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 9:
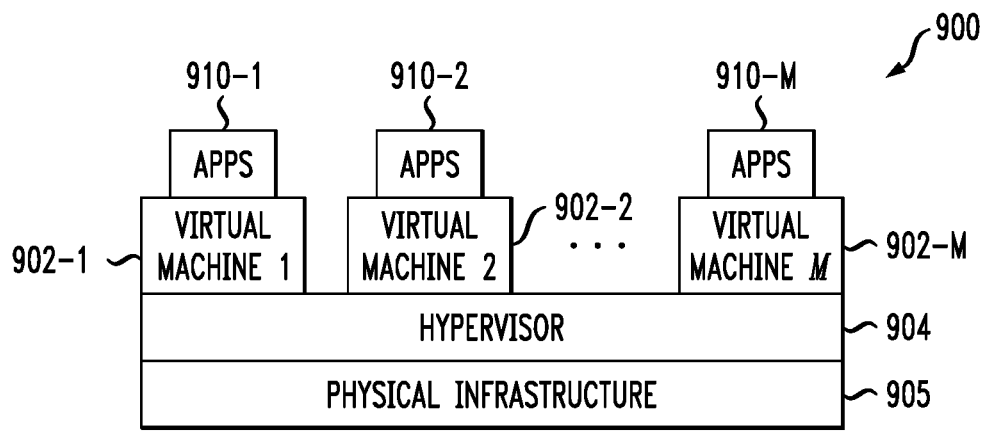
FIG. 9 illustrates an exemplary processing platform that may be used to implement at least a portion of one or more embodiments of the invention comprising a cloud infrastructure.

Referring now to FIG. 9, one possible processing platform that may be used to implement at least a portion of one or more embodiments of the invention comprises cloud infrastructure 900. The cloud infrastructure 900 in this exemplary processing platform comprises virtual machines (VMs) 902-1, 902-2, . . . , 902-M implemented using a hypervisor 904. The hypervisor 904 runs on physical infrastructure 905. The cloud infrastructure 900 further comprises sets of applications 910-1, 910-2, . . . 910-M running on respective ones of the virtual machines 902-1, 902-2, . . . 902-M under the control of the hypervisor 904.

The cloud infrastructure 900 may encompass the entire given system or only portions of that given system, such as one or more of client, servers, controller, authentication server or relying server in the system.

Although only a single hypervisor 904 is shown in the embodiment of FIG. 9, the system may of course include multiple hypervisors each providing a set of virtual machines using at least one underlying physical machine.

An example of a commercially available hypervisor platform that may be used to implement hypervisor 904 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

Figure 10:
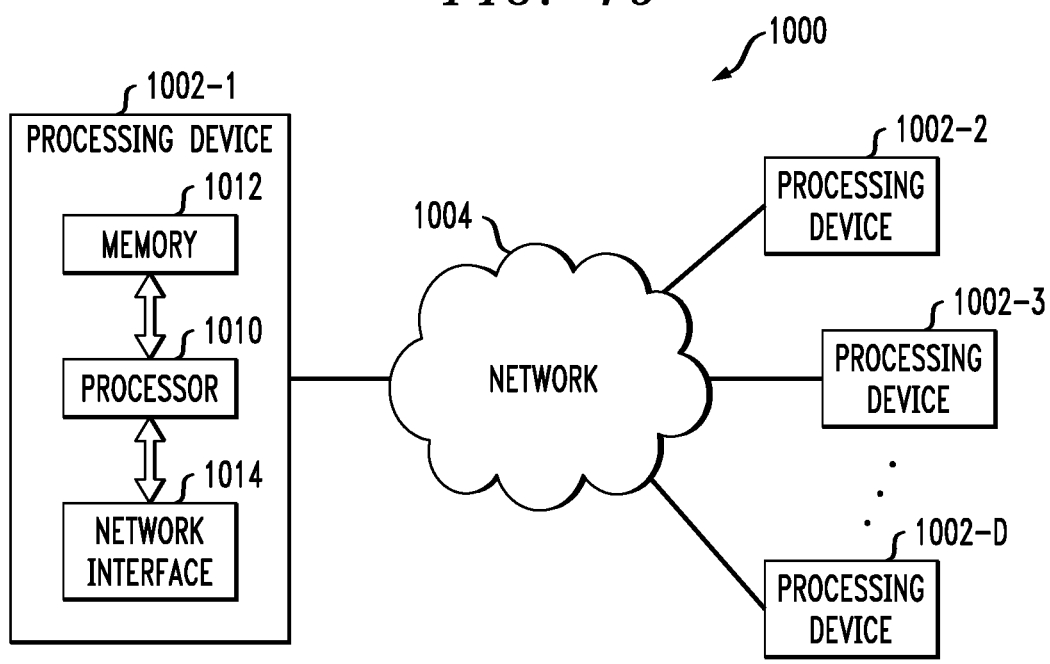
FIG. 10 illustrates another exemplary processing platform that may be used to implement at least a portion of one or more embodiments of the invention.

Another example of a processing platform is processing platform 1000 shown in FIG. 10. The processing platform 1000 in this embodiment comprises at least a portion of the given system and includes a plurality of processing devices, denoted 1002-1, 1002-2, 1002-3, . . . 1002-D, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an application specific integrated circuit (ASIC), a field programmable gate array (FPGA) or other type of processing circuitry, as well as portions or combinations of such circuitry elements, and the memory 1012, which may be viewed as an example of a "computer program product" having executable computer program code embodied therein, may comprise random access memory (RAM), read only memory (ROM) or other types of memory, in any combination.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 9 or 10, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from the secret sharing with reconstruction verification techniques as disclosed herein. Also, the particular configuration of communication system and processing device elements herein, and the associated secret sharing techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   receiving a plurality of shares of a secret, wherein a set of said shares comprising said plurality of shares are generated from said secret using a secret splitting scheme, wherein the secret can be reconstructed from a subset of the set of shares that satisfies a predefined reconstruction threshold;
   reconstructing, using at least one processing device associated with a reconstructor entity, said secret if said plurality of shares satisfy said predefined reconstruction threshold; and
   generating, using said at least one processing device associated with said reconstructor entity, a proof identifying at least one of said plurality of shares that was used in said reconstruction of said secret.

2. The method of claim 1, further comprising the step of providing said proof to a verifier, wherein said verifier has no access to said plurality of shares used in said reconstruction, and wherein said provided proof is verified by said verifier.

3. The method of claim 2, wherein said proof comprises a representation of said at least one share used in said reconstruction, and wherein said proof verification performed by said verifier is based on auxiliary information derived by said secret splitting scheme used to share said secret.

4. The method of claim 2, further comprising the step of storing said proof in an audit log sufficiently prior to said providing step, wherein said proof allows said verifier to subsequently certify the type of said reconstruction.

5. The method of claim 2, further comprising the step of providing said reconstructed secret to said verifier, wherein said secret comprises a cryptographic key that protects a resource access-controlled by said verifier, wherein said reconstruction is associated with a user requesting access to said protected resource, and wherein said user is granted, by said verifier, a level of access to said protected resource based on a content of said proof, said reconstructed secret and one or more predefined policies.

6. The method of claim 5, wherein shares in said set of shares are ranked, wherein said proof identifies whether one or more predefined shares from said set of shares were used in said reconstruction of said secret, and wherein said level of access to said protected resource granted to said user depends on a level of the rank of said predefined shares used in said reconstruction of said secret.

7. The method of claim 2, further comprising the step of providing said reconstructed secret to said verifier, wherein said reconstruction is performed on behalf of said verifier, and wherein said proof allows said verifier to one or more of subsequently gain visibility on a type of said reconstruction and subsequently certify whether said reconstruction using said plurality of shares is one or more of a normal type and an emergency type.

8. The method of claim 1, wherein at least one of said shares generated using said secret splitting scheme comprises a fixed share based on user-specified data.

9. The method of claim 1, wherein said proof identifies whether one particular predefined share from said set of shares was used in said reconstruction of said secret, and wherein said predefined share is possessed by one predefined party.

10. The method of claim 9, wherein said one predefined share comprises an online share possessed by a designated enterprise server and presented by said designated enterprise server in an online mode and wherein said proof certifies that said reconstruction occurs in an online mode.

11. The method of claim 1, wherein said proof identifies whether one predefined share from said set of shares was used in said reconstruction of said secret.

12. The method of claim 11, wherein shares in said set of shares are ranked and wherein said proof certifies that a share of a specific rank from said set of shares was used in said reconstruction of said secret.

13. The method of claim 1, wherein said proof identifies whether one predefined subset of said set of shares was used in said reconstruction of said secret.

14. The method of claim 1, wherein said proof identifies the plurality of shares from said set of shares that were used in said reconstruction of said secret.

15. The method of claim 1, wherein said proof further identifies at least one share from said set of shares that was not used in said reconstruction of said secret.

16. The method of claim 1, wherein said secret protects at least one data item.

17. The method of claim 1, further comprising the step of proactivizing said steps prior to said reconstructing step based on a secret challenge specified by a verifier of said proof, wherein said obtained plurality of shares comprise a new sharing of said secret that is based on said secret challenge, and wherein said reconstructing and generating steps are based on said new sharing of said secret.

18. The method of claim 17, wherein said secret challenge comprises a fresh random value, wherein said new sharing of said secret comprises a set of fresh shares derived from a secret random modification of a prior sharing of said secret, and wherein said proof certifies that a plurality of fresh shares was used in said reconstruction of said secret.

19. A non-transitory machine-readable recordable storage medium, wherein one or more software programs when executed by one or more processing devices implement the following steps:
receiving a plurality of shares of a secret, wherein a set of said shares comprising said plurality of shares are generated from said secret using a secret splitting scheme, wherein the secret can be reconstructed from a subset of the set of shares that satisfies a predefined reconstruction threshold;
reconstructing, using at least one processing device associated with a reconstructor entity, said secret if said plurality of shares satisfy said predefined reconstruction threshold; and
generating, using said at least one processing device associated with said reconstructor entity, a proof identifying at least one of said plurality of shares that was used in said reconstruction of said secret.

20. An apparatus, comprising:
a memory; and
at least one processing device, coupled to the memory, operative to implement the following steps:
receiving a plurality of shares of a secret, wherein a set of said shares comprising said plurality of shares are generated from said secret using a secret splitting scheme, wherein the secret can be reconstructed from a subset of the set of shares that satisfies a predefined reconstruction threshold;
reconstructing, using at least one processing device associated with a reconstructor entity, said secret if said plurality of shares satisfy said predefined reconstruction threshold; and
generating, using said at least one processing device associated with said reconstructor entity, a proof identifying at least one of said plurality of shares that was used in said reconstruction of said secret.

21. The apparatus of claim 20, wherein said at least one processing device is further configured to provide said proof to a verifier, wherein said verifier has no access to said plurality of shares used in said reconstruction, wherein said provided proof is verified by said verifier, wherein said proof comprises a representation of said at least one share used in said reconstruction, and wherein said proof verification performed by said verifier is based on auxiliary information derived by said secret splitting scheme used to share said secret.

22. The apparatus of claim 21, wherein said at least one processing device is further configured to provide said reconstructed secret to said verifier, wherein said secret comprises a cryptographic key that protects a resource access-controlled by said verifier, wherein said reconstruction is associated with a user requesting access to said protected resource, and wherein said user is granted, by said verifier, a level of access to said protected resource based on a content of said proof, said reconstructed secret and one or more predefined policies.

23. The apparatus of claim 21, further comprising the step of providing said reconstructed secret to said verifier, wherein said reconstruction is performed on behalf of said verifier, and wherein said proof allows said verifier to one or more of subsequently gain visibility on a type of said reconstruction and subsequently certify whether said reconstruction using said plurality of shares is one or more of a normal type and an emergency type.

24. The apparatus of claim 20, wherein said proof identifies one or more of (i) whether one particular predefined share from said set of shares was used in said reconstruction of said secret, wherein said predefined share is possessed by one predefined party; (ii) whether one predefined share from said set of shares was used in said reconstruction of said secret; (iii) whether one predefined subset of said set of shares was used in said reconstruction of said secret; (iv) the plurality of shares from said set of shares that were used in said reconstruction of said secret; and (v) at least one share from said set of shares that was not used in said reconstruction of said secret.

25. The apparatus of claim 20, wherein said at least one processing device is further configured to proactivize said steps prior to said reconstructing step based on a secret challenge specified by a verifier of said proof, wherein said obtained plurality of shares comprise a new sharing of said secret that is based on said secret challenge, and wherein said reconstructing and generating steps are based on said new sharing of said secret.

* * * * *